US009498936B2

(12) United States Patent
Douglas et al.

(10) Patent No.: US 9,498,936 B2
(45) Date of Patent: *Nov. 22, 2016

(54) MULTILAYER BARRIER STRUCTURES, METHODS OF MAKING THE SAME AND PACKAGES MADE THEREFROM

(75) Inventors: Michael J. Douglas, Fremont, WI (US); Duane H. Buelow, Oshkosh, WI (US); Chad D. Mueller, Neenah, WI (US); Robert J. Blemberg, Appleton, WI (US); Roberto P. Castellani, Buenos Aires (AR)

(73) Assignee: COVERIS FLEXIBLES US LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 11/029,200

(22) Filed: Jan. 4, 2005

(65) Prior Publication Data

US 2005/0118374 A1    Jun. 2, 2005

Related U.S. Application Data

(63) Continuation of application No. 10/735,366, filed on Dec. 12, 2003, now abandoned.

(60) Provisional application No. 60/452,747, filed on Mar. 7, 2003, provisional application No. 60/453,641, filed on Mar. 11, 2003.

(51) Int. Cl.
*B32B 27/08* (2006.01)

(52) U.S. Cl.
CPC ............ *B32B 27/08* (2013.01); *B65D 2275/02* (2013.01); *Y10T 428/1352* (2015.01)

(58) Field of Classification Search
CPC ....... B32B 27/08; B32B 27/32; B32B 27/30; B32B 2250/05; B32B 2250/24; B32B 2250/242; B32B 2250/244; B32B 2250/246; B32B 2250/248; B32B 2250/40; B32B 2307/518; B32B 2307/52; B32B 2307/54; B32B 2307/546; B32B 2307/552; Y10T 428/1352; B65D 2275/02
USPC ............... 426/125, 127, 129; 428/34.8, 34.6, 428/34.9, 475.8
See application file for complete search history.

(56) References Cited

U.S. PATENT DOCUMENTS 2,664,358 A   12/1953  Eichler
3,456,044 A    7/1969  Pahlkce
(Continued)

FOREIGN PATENT DOCUMENTS

AU    9889394 A  *  5/1999
CA    1240247      8/1988
(Continued)

OTHER PUBLICATIONS

Soarnol® SG372B Technical Bulletin, www.soarus.com/pdf/technotes/SG372B.pdf.*

(Continued)

*Primary Examiner* — Viren Thakur
(74) *Attorney, Agent, or Firm* — Stoel Rives LLP

(57) ABSTRACT

Multilayer structures, methods of making the same and packages made therefrom are provided. The multilayer structures are useful for packaging bone-in meat or other like products. More specifically, the multilayer structures have sufficient rigidity and strength to contain bone-in meat or other like products, while also maintaining good oxygen barrier properties. In addition, multilayer structures can easily seal to themselves or to other structures. Moreover, the multilayer structures are biaxially oriented and heat-shrinkable.

25 Claims, 1 Drawing Sheet

(56) References Cited

U.S. PATENT DOCUMENTS

| | | | |
|---|---|---|---|
| 3,694,231 A | 9/1972 | Izzo et al. | |
| 3,741,253 A | 6/1973 | Brax et al. | |
| 4,044,187 A * | 8/1977 | Kremkau | 428/212 |
| 4,104,404 A * | 8/1978 | Bieler et al. | 428/35.2 |
| 4,178,401 A * | 12/1979 | Weinberg et al. | 383/109 |
| 4,255,491 A | 3/1981 | Igarashi | |
| 4,469,742 A | 9/1984 | Oberle et al. | |
| 4,501,798 A | 2/1985 | Koschak et al. | |
| 4,534,984 A | 8/1985 | Kuehne | |
| 4,561,920 A | 12/1985 | Foster | |
| 4,572,854 A | 2/1986 | Dallmann et al. | |
| 4,576,844 A | 3/1986 | Murray et al. | |
| 4,584,234 A | 4/1986 | Hirose et al. | |
| 4,601,929 A | 7/1986 | Erk et al. | |
| 4,668,571 A * | 5/1987 | Moriarty, Jr. | 428/327 |
| 4,704,101 A | 11/1987 | Schirmer | |
| 4,724,185 A | 2/1988 | Shah | |
| 4,729,926 A | 3/1988 | Koteles et al. | |
| 4,735,855 A | 4/1988 | Wofford et al. | |
| 4,746,562 A | 5/1988 | Fant | |
| 4,753,700 A | 6/1988 | Fant | |
| 4,755,403 A | 7/1988 | Ferguson | |
| 4,755,419 A | 7/1988 | Shah | |
| 4,765,857 A | 8/1988 | Ferguson | |
| 4,770,731 A | 9/1988 | Ferguson | |
| 4,778,634 A | 10/1988 | Douglas | |
| 4,788,105 A * | 11/1988 | Mueller et al. | 428/412 |
| 4,801,486 A | 1/1989 | Quacquarella et al. | |
| 4,851,290 A | 7/1989 | Vicik | |
| 4,855,178 A | 8/1989 | Langley | |
| 4,888,223 A | 12/1989 | Sugimoto et al. | |
| 4,909,726 A | 3/1990 | Bekele | |
| 4,911,963 A * | 3/1990 | Lustig et al. | 428/36.91 |
| 4,937,112 A | 6/1990 | Schirmer | |
| 4,939,076 A | 7/1990 | Mueller | |
| 4,954,391 A | 9/1990 | Kotani et al. | |
| 4,977,022 A | 12/1990 | Mueller | |
| 4,997,710 A | 3/1991 | Pockat et al. | |
| 5,004,647 A * | 4/1991 | Shah | 428/349 |
| 5,020,922 A | 6/1991 | Schirmer | |
| 5,023,121 A | 6/1991 | Pockat et al. | |
| 5,037,683 A | 8/1991 | Schirmer | |
| 5,053,259 A | 10/1991 | Vicik | |
| 5,055,328 A | 10/1991 | Evert et al. | |
| 5,069,955 A | 12/1991 | Tse et al. | |
| 5,069,964 A | 12/1991 | Tolliver | |
| 5,079,051 A | 1/1992 | Garland et al. | |
| 5,089,308 A | 2/1992 | Nordness et al. | |
| 5,112,696 A | 5/1992 | Roberts | |
| 5,160,767 A | 11/1992 | Genske et al. | |
| 5,256,458 A | 10/1993 | Oxley et al. | |
| 5,288,531 A * | 2/1994 | Falla et al. | 428/35.2 |
| 5,332,615 A * | 7/1994 | Watanabe | 428/215 |
| 5,356,676 A | 10/1994 | Von Widdern et al. | |
| 5,374,459 A | 12/1994 | Mumpower et al. | |
| 5,382,470 A | 1/1995 | Vicik | |
| 5,402,625 A | 4/1995 | Halstead | |
| 5,433,908 A | 7/1995 | Harita et al. | |
| 5,447,591 A | 9/1995 | Ennis | |
| 5,449,552 A | 9/1995 | Bochow et al. | |
| 5,482,770 A | 1/1996 | Bekele | |
| 5,482,771 A | 1/1996 | Shah | |
| 5,491,009 A | 2/1996 | Bekele | |
| RE35,285 E | 6/1996 | Quacquarella et al. | |
| 5,534,276 A | 7/1996 | Ennis | |
| 5,540,646 A | 7/1996 | Williams et al. | |
| 5,545,419 A * | 8/1996 | Brady et al. | 426/129 |
| 5,549,943 A | 8/1996 | Vicik | |
| 5,558,930 A | 9/1996 | DiPoto | |
| 5,562,996 A | 10/1996 | Kuriu et al. | |
| 5,565,048 A | 10/1996 | Lee et al. | |
| 5,591,520 A * | 1/1997 | Migliorini et al. | 428/347 |
| 5,595,623 A | 1/1997 | Lulham et al. | |
| RE35,567 E * | 7/1997 | Newsome | 428/34.9 |
| 5,645,788 A | 7/1997 | Bekele | |
| 5,688,456 A | 11/1997 | Kuriu et al. | |
| 5,698,279 A | 12/1997 | Vicik | |
| 5,741,566 A | 4/1998 | Hogstrom et al. | |
| 5,759,648 A | 6/1998 | Idlas | |
| 5,759,649 A | 6/1998 | Dinter et al. | |
| 5,763,095 A | 6/1998 | Ramesh et al. | |
| 5,837,358 A * | 11/1998 | Bauer et al. | 428/213 |
| 5,846,620 A | 12/1998 | Compton | |
| 5,866,214 A | 2/1999 | Ramesh | |
| 5,874,155 A | 2/1999 | Gehrke et al. | |
| 5,910,374 A | 6/1999 | Shah | |
| 5,914,164 A | 6/1999 | Ciocca et al. | |
| 5,928,740 A | 7/1999 | Wilhoit et al. | |
| 6,010,792 A * | 1/2000 | Lind et al. | 428/516 |
| 6,015,235 A | 1/2000 | Kraimer et al. | |
| 6,063,417 A | 5/2000 | Paleari et al. | |
| 6,063,462 A * | 5/2000 | Tsukamoto et al. | 428/36.7 |
| 6,068,933 A | 5/2000 | Shepard et al. | |
| 6,071,626 A | 6/2000 | Frisk | |
| 6,074,715 A * | 6/2000 | Lind et al. | 428/35.4 |
| 6,106,935 A | 8/2000 | Lambert et al. | |
| 6,110,600 A | 8/2000 | Ramesh | |
| 6,117,465 A * | 9/2000 | Falla | 426/127 |
| 6,117,541 A | 9/2000 | Frisk | |
| 6,150,011 A | 11/2000 | Bax et al. | |
| 6,206,569 B1 | 3/2001 | Kraimer et al. | |
| 6,210,765 B1 | 4/2001 | Tanaka et al. | |
| 6,211,471 B1 | 4/2001 | Rocke et al. | |
| 6,221,410 B1 | 4/2001 | Ramesh et al. | |
| 6,221,470 B1 * | 4/2001 | Ciocca et al. | 428/218 |
| 6,224,956 B1 | 5/2001 | Shah et al. | |
| 6,274,228 B1 | 8/2001 | Ramesh et al. | |
| 6,287,613 B1 | 9/2001 | Childress et al. | |
| 6,287,652 B2 | 9/2001 | Speckhals et al. | |
| 6,291,041 B1 | 9/2001 | Howells et al. | |
| 6,296,886 B1 | 10/2001 | DePoorter et al. | |
| 6,299,984 B1 | 10/2001 | Forloni | |
| 6,333,061 B1 | 12/2001 | Vadhar | |
| 6,346,285 B1 | 2/2002 | Ramesh | |
| 6,436,498 B1 | 8/2002 | Rangwalla et al. | |
| 6,447,892 B1 | 9/2002 | Hatley et al. | |
| 6,458,469 B1 | 10/2002 | DeLisio et al. | |
| 6,465,065 B1 | 10/2002 | Teumac et al. | |
| 6,500,559 B2 * | 12/2002 | Hofmeister et al. | 428/474.4 |
| 6,503,637 B1 | 1/2003 | Van Loon | |
| 6,511,688 B2 | 1/2003 | Edwards et al. | |
| 6,514,583 B1 | 2/2003 | Ahlgren et al. | |
| 6,534,137 B1 | 3/2003 | Vadhar | |
| 6,562,443 B1 | 5/2003 | Espinel et al. | |
| 6,579,584 B1 | 6/2003 | Compton | |
| 6,579,621 B1 | 6/2003 | Shah | |
| 6,599,639 B2 | 7/2003 | Dayrit et al. | |
| 6,602,590 B2 | 8/2003 | Ting et al. | |
| 6,607,795 B1 | 8/2003 | Yang et al. | |
| 6,610,392 B1 * | 8/2003 | Ramesh et al. | 428/213 |
| 6,663,905 B1 | 12/2003 | Ennis et al. | |
| 6,682,792 B2 | 1/2004 | Schmal et al. | |
| 6,703,141 B1 | 3/2004 | Lu et al. | |
| 6,746,622 B2 | 6/2004 | Yang et al. | |
| 6,773,820 B1 | 8/2004 | Wilhoit et al. | |
| 6,777,046 B1 * | 8/2004 | Tatarka et al. | 428/34.9 |
| 6,794,042 B1 | 9/2004 | Merlin et al. | |
| 6,803,113 B2 | 10/2004 | Porter et al. | |
| 6,815,057 B2 | 11/2004 | Hodson et al. | |
| 6,824,864 B2 | 11/2004 | Bader | |
| 6,825,276 B2 * | 11/2004 | Forte et al. | 525/191 |
| 6,831,025 B2 | 12/2004 | Rudisill et al. | |
| 6,893,730 B2 | 5/2005 | Moulton et al. | |
| 6,942,927 B2 | 9/2005 | Shepard et al. | |
| 6,969,483 B1 * | 11/2005 | Woo et al. | 264/405 |
| 7,022,258 B2 | 4/2006 | Yang et al. | |
| 7,029,734 B2 | 4/2006 | Wuest et al. | |
| 7,135,526 B2 | 11/2006 | Farley et al. | |
| 7,183,006 B2 | 2/2007 | Bamore et al. | |
| 7,252,878 B2 | 8/2007 | Watanabe et al. | |
| 7,427,430 B2 | 9/2008 | Rhee et al. | |
| 2001/0003021 A1 | 6/2001 | Shepard et al. | |
| 2001/0008658 A1 | 7/2001 | Barmore et al. | |
| 2001/0010846 A1 | 8/2001 | Hofmeister et al. | |

(56) References Cited

U.S. PATENT DOCUMENTS

| | | |
|---|---|---|
| 2001/0036555 A1 | 11/2001 | Ramesh et al. |
| 2001/0041201 A1 | 11/2001 | Ramesh et al. |
| 2002/0004112 A1 | 1/2002 | Muller et al. |
| 2002/0055006 A1 | 5/2002 | Vogel et al. |
| 2002/0061982 A1 | 5/2002 | Donald et al. |
| 2002/0068137 A1 | 6/2002 | Paleari et al. |
| 2002/0119334 A1 | 8/2002 | Shepard et al. |
| 2002/0164444 A1 | 11/2002 | Hunt et al. |
| 2002/0197478 A1 | 12/2002 | Muggli et al. |
| 2003/0087057 A1 | 5/2003 | Blemberg et al. |
| 2003/0087114 A1 | 5/2003 | Ferri et al. |
| 2003/0099851 A1 | 5/2003 | Mount et al. |
| 2003/0170409 A1 | 9/2003 | Porter et al. |
| 2004/0033382 A1 | 2/2004 | Kendig |
| 2004/0043167 A1 | 3/2004 | Holzem et al. |
| 2004/0058178 A1 | 3/2004 | Yang et al. |
| 2004/0127614 A1 | 7/2004 | Jiang et al. |
| 2004/0131805 A1 | 7/2004 | Merical et al. |
| 2004/0180165 A1 | 9/2004 | Porter |
| 2004/0234797 A1 | 11/2004 | Schwark et al. |
| 2005/0028459 A1 | 2/2005 | Crandell et al. |
| 2005/0069660 A1 | 3/2005 | Climenhage |
| 2005/0069719 A1 | 3/2005 | Blemberg |
| 2005/0084636 A1 | 4/2005 | Papenfuss et al. |
| 2005/0106343 A1 | 5/2005 | Kim et al. |
| 2005/0112461 A1 | 5/2005 | Amine et al. |
| 2005/0118373 A1 | 6/2005 | Blemberg et al. |
| 2005/0118374 A1 | 6/2005 | Douglas et al. |
| 2005/0136202 A1 | 6/2005 | Kendig et al. |
| 2005/0202262 A1* | 9/2005 | De Kroon et al. ........ 428/474.4 |
| 2006/0014002 A1 | 1/2006 | Moulton et al. |
| 2006/0166021 A1 | 7/2006 | De Kroon et al. |
| 2006/0172095 A1 | 8/2006 | Elsaesser |
| 2007/0031691 A1 | 2/2007 | Forloni et al. |
| 2007/0036999 A1 | 2/2007 | Rogers Agent et al. |
| 2007/0042147 A1 | 2/2007 | Altman et al. |
| 2007/0082188 A1 | 4/2007 | Rasmussen |
| 2007/0141372 A1 | 6/2007 | Su et al. |
| 2007/0187279 A1 | 8/2007 | Zuppiger et al. |
| 2007/0218308 A1 | 9/2007 | Lewtas et al. |
| 2007/0259142 A1 | 11/2007 | Lischefski et al. |
| 2007/0275134 A1 | 11/2007 | Siegel et al. |
| 2007/0292567 A1 | 12/2007 | Kaas et al. |
| 2008/0003337 A1 | 1/2008 | Rasmussen et al. |
| 2008/0032110 A1 | 2/2008 | Wood et al. |
| 2008/0063759 A1 | 3/2008 | Raymond et al. |
| 2008/0063760 A1 | 3/2008 | Raymond et al. |
| 2008/0070052 A1 | 3/2008 | Chow et al. |
| 2008/0087664 A1 | 4/2008 | Robison et al. |
| 2008/0107899 A1 | 5/2008 | Lu |
| 2008/0145581 A1 | 6/2008 | Tanny |
| 2008/0145670 A1 | 6/2008 | Song et al. |
| 2008/0176088 A1 | 7/2008 | Elia et al. |
| 2008/0182053 A1 | 7/2008 | Broadus et al. |
| 2008/0182952 A1 | 7/2008 | Giesbrecht et al. |
| 2008/0261064 A1 | 10/2008 | Laiho et al. |
| 2010/0015423 A1 | 1/2010 | Schaefer et al. |

FOREIGN PATENT DOCUMENTS

| | | |
|---|---|---|
| CA | 2518401 | 9/2004 |
| CA | 2518463 | 2/2013 |
| DE | 102 27 580 | 1/2004 |
| EP | 0 465 681 | 1/1992 |
| EP | 681914 A1 * | 11/1995 |
| EP | 713765 A2 * | 5/1996 |
| EP | 1 122 060 | 8/2001 |
| EP | 1 749 656 | 2/2007 |
| JP | 2000188966 A * | 7/2000 |
| JP | 2001171756 A * | 6/2001 |
| WO | WO 9808891 A1 * | 3/1998 |
| WO | 00/37253 A1 | 6/2000 |
| WO | WO 00/37253 | 6/2000 |
| WO | 02/051630 A2 | 7/2002 |
| WO | WO 02/051630 | 7/2002 |
| WO | WO 02/060267 A1 * | 8/2002 |
| WO | WO 2004/005021 | 1/2004 |
| WO | WO 2004/080800 | 9/2004 |
| WO | WO 2004/080804 | 9/2004 |
| WO | WO 2010/009245 | 1/2010 |

OTHER PUBLICATIONS

Pending U.S. Appl. No. 11/029,195, filed Jan. 4, 2005.
Examiner's First Report in related Australian Patent Application No. 2004220150, dated Mar. 24, 2009, pp. 1-2.
Office Action mailed May 2, 2014 in co-pending U.S. Appl. No. 11/029,195, now published as publication No. US 2005/0118373.
Final Office Action mailed May 13, 2014 in co-pending U.S. Appl. No. 12/349,357, now published as publication No. US 2010/0015423.
Final Office Action mailed Feb. 5, 2015 in co-pending U.S. Appl. No. 11/029,195, now published as publication No. US 2005/0118373.
Office Action mailed Apr. 6, 2015 in co-pending U.S. Appl. No. 12/349,357, now published as publication No. US 2010/0015423.
Final Office Action mailed Oct. 6, 2015 in co-pending U.S. Appl. No. 12/349,357, now published as publication No. US 2010/0015423.
http://web.archive.org/web/20021115155950/http://ceh.sric.sri.com/Enframe/Report.html?report=580.0650&show=Abstract.html, Nov. 15, 2002.
http://web.archive.org/web/20030110103655/http://www.packexpo.com/ve/33953/main.html, Jan. 10, 2003.
Jenkins, Wilmer A., "Packaging Foods with Plastics," Technomic Publishing Co., 1991, p. 39.
Mazza, G., Miniati, E., "Anthocyanins in Fruits, Vegetables and Grains," Boca Raton: CRC, p. 89—Cited in Prior et al., J. Agric. Food Chem. 46, 2686 (1998).
Brenneisen R., Stinegger, E., "Quantitativer Vergleich der Polyphenole in Fruchten von Vaccinium myrtillus L. unterschiendlichen Reifegrades," Pharm. Acta Helv. 56, 180 (1991).
Brenneisen, R., Steinegger, E., "Zur Analytik der Polyphenole der Fruchte von *Vaccinium myrtillus* L. (Ericaceae)," Pharm. Acta Helv. 56, 341 (1981).
Jaakola, L., Maatta, K., Pirttila, A.M., Torronen, R., Karenlampi, S., Hohtola, A., "Expression of Genes Involved in Anthocyanin Biosynthesis in Relation to Anthocyanin, Proanthocyanidin, and Flavonol Levels during Bilberry Fruit Development," Plant Physiology 130, 729 (2002).
Prior, R.L., Cao, G., Martin, A., Sofic, E., McEwen, Jr., O'Brien, C., Lischner, N., Elhenfeldt, M. Kalt, W., Krewer, G., Mainland, C.M., "Antioxidant Capacity as Influenced by Total Phenolic and anthocyanin Content, Maturity, and Variety of Vaccinium Species," J. Agric. Food Chem. 46, 2686 (1998).
Notification of Transmittal of the International Search Report and the Written Opinion of the International Searching Authority mailed Nov. 3, 2004 in International Application No. PCT/US2004/06639.
Notification of Transmittal of the International Search Report and the Written Opinion of the International Searching Authority mailed Oct. 27, 2004 in International Application No. PCT/US2004/006611.
Notification of Transmittal of the International Search Report and the Written Opinion of the International Searching Authority mailed Mar. 12, 2010 in International Application No. PCT/US2009/50712.
Office Action mailed Jul. 25, 2007 in co-pending U.S. Appl. No. 11/029,195, now published as publication No. US2005/118373.
Response and Amendment to Non-Final Office Action filed Nov. 26, 2007 in co-pending U.S. Appl. No. 11/029,195, now published as publication No. US 2005/0118373.
Final Office Action mailed Feb. 26, 2008 in co-pending U.S. Appl. No. 11/029,195, now published as publication No. US 2005/0118373.
Notice of Appeal filed Aug. 25, 2008 in co-pending U.S. Appl. No. 11/029,195, now published as publication No. US 2005/0118373.
Response and Amendment to Final Office Action and RCE filed Oct. 21, 2008 in co-pending U.S. Appl. No. 11/029,195, now published as publication No. US 2005/0118373.

(56) References Cited

OTHER PUBLICATIONS

Office Action mailed Dec. 10, 2008 in co-pending U.S. Appl. No. 11/029,195, now published as publication No. US 2005/0118373.
Notice of Appeal filed Jun. 9, 2009 in co-pending U.S. Appl. No. 11/029,195, now published as publication No. US 2005/0118373.
Response and Amendment to Final Office Action filed Jun. 10, 2009 in co-pending U.S. Appl. No. 11/029,195, now published as publication No. US 2005/0118373.
Supplemental Response and Amendment to Non-Final Office Action filed Jul. 17, 2009 in co-pending U.S. Appl. No. 11/029,195, now published as publication No. US 2005/0118373.
RCE filed Aug. 4, 2009 in co-pending U.S. Appl. No. 11/029,195, now published as publication No. US 2005/0118373.
Office Action mailed Oct. 15, 2009 in co-pending U.S. Appl. No. 11/029,195, now published as publication No. US 2005/0118373.
Response and Amendment to Non-Final Office Action and Terminal Disclaimer filed Apr. 15, 2010 in co-pending U.S. Appl. No. 11/029,195, now published as publication No. US 2005/0118373.
Final Office Action mailed Jul. 6, 2010 in co-pending U.S. Appl. No. 11/029,195, now published as publication No. US 2005/0118373.
Amendment and Response to Final Office Action and RCE filed Jan. 6, 2011 in co-pending U.S. Appl. No. 11/029,195, now published as publication No. US 2005/0118373.
Office Action mailed Mar. 16, 2011 in co-pending U.S. Appl. No. 11/029,195, now published as publication No. US 2005/0118373.
Amendment and Response to Office Action filed Sep. 16, 2011 in co-pending U.S. Appl. No. 11/029,195, now published as publication No. US 2005/0118373.
Applicant-Initiated Interview Summary mailed Sep. 23, 2011 in co-pending U.S. Appl. No. 11/029,195, now published as publication No. US 2005/0118373.
Supplementary Amendment and Response filed Feb. 28, 2013 in co-pending U.S. Appl. No. 11/029,195, now published as publication No. US 2005/0118373.
Supplementary Amendment and Response filed Apr. 19, 2013 in co-pending U.S. Appl. No. 11/029,195, now published as publication No. US 2005/0118373.
Final Office Action mailed Jul. 26, 2013 in co-pending U.S. Appl. No. 11/029,195, now published as publication No. US 2005/0118373.
Applicant-Initiated Interview Summary mailed Jan. 16, 2014 in co-pending U.S. Appl. No. 11/029,195, now published as publication No. US 2005/0118373.
Amendment and Response to Final Office Action and RCE filed Jan. 27, 2014 in co-pending U.S. Appl. No. 11/029,195, now published as publication No. US 2005/0118373.
Office Action mailed Nov. 23, 2011 in co-pending U.S. Appl. No. 12/349,357, now published as publication No. US 2010/0015423.
Amendment and Response to Office Action filed May 23, 2012 in co-pending U.S. Appl. No. 12/349,357, now published as publication No. US 2010/0015423.
Final Office Action mailed Jun. 14, 2012 in co-pending U.S. Appl. No. 12/349,357, now published as publication No. US 2010/0015423.
Amendment and Response to Final Office Action and RCE filed Dec. 14, 2012 in co-pending U.S. Appl. No. 12/349,357, now published as publication No. US 2010/0015423.
Office Action mailed Oct. 1, 2013 in co-pending U.S. Appl. No. 12/349,357, now published as publication No. US 2010/0015423.
Amendment and Response to Office Action filed Apr. 1, 2014 in co-pending U.S. Appl. No. 12/349,357, now published as publication No. US 2010/0015423.
Notice of Allowance issued in U.S. Appl. No. 11/029,195 on Apr. 29, 2016.
Corrected Notice of Allowability issued in U.S. Appl. No. 11/029,195 on May 16, 2016.
Non-Final Office Action issued in U.S. Appl. No. 12/349,357 on May 19, 2016.
U.S. Appl. No. 11/029,195, Notice of Allowance, Sep. 15, 2016, 21.

* cited by examiner

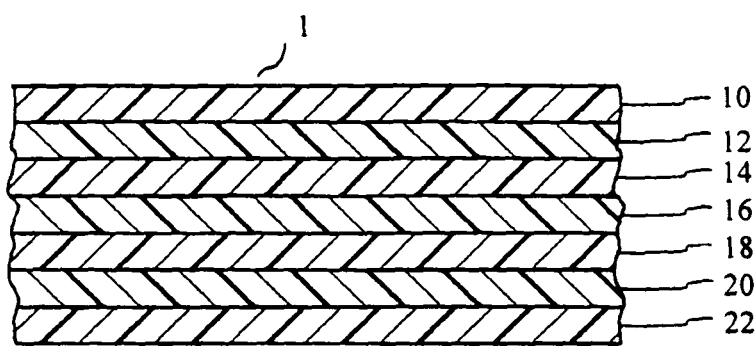

MULTILAYER BARRIER STRUCTURES, METHODS OF MAKING THE SAME AND PACKAGES MADE THEREFROM

This is a Continuation Application of U.S. patent application Ser. No. 10/735,366 filed Dec. 12, 2003, now abandoned which claims priority to U.S. Provisional Patent Application No. 60/453,641, filed Mar. 11, 2003, and U.S. Provisional Patent Application No. 60/452,747, filed Mar. 7, 2003, each of which is hereby incorporated by reference in its entirety.

TECHNICAL FIELD

Multilayer structures, methods of making the same and packages made therefrom useful for packaging products, such as bone-in meat, cheese and other like products are provided. More specifically, the present invention relates to multilayer structures, methods of making the same, and packages made therefrom useful for bone-in meat packaging, cook-in packaging, shrink film packaging, packaging for case ready meats, hot-fill applications, pet food, retort or lidding, and other like packaging. The multilayer structures are coextruded and have sufficient durability, strength, tear resistance and puncture resistance, while also providing a high degree of oxygen barrier protection. In addition, the present invention relates to multilayer barrier structures, methods of making the same, and packages made therefrom useful for packaging that is biaxially oriented so as to be heat-shrinkable around products.

BACKGROUND

It is generally known to utilize thermoplastic multilayer structures, such as films, sheets or the like, to package products. For example, typical products packaged with thermoplastic multilayer structures include perishable products, such as food. Specifically, meats and cheeses are typically packaged in thermoplastic structures. In addition, it is generally known that cook-in structures may be utilized to package food products, whereby the products are then heated to cook the food products contained within the packages. Moreover, shrink films are known for packaging food products, such as meat and cheese.

One type of meat that may be packaged within thermoplastic multilayer structures is bone-in meat. Bone-in meat products often contain sharp bones that protrude outwardly from the meat. Typical cuts of bone-in meat include a half carcass cut, hindquarter cut, round with shank, bone-in shank, full loin, bone-in ribs, forequarter, shoulder and/or other like cuts of meat. When bone-in meat products are packaged and/or shipped, the protruding bones often can puncture or tear the packaging materials. This puncturing or tearing of the packaging material by the protruding bones can occur at the initial stage of packaging or at the later stage of evacuation of the packaging, which may expose the bone-in meat products to oxygen and moisture, thereby having deleterious effects on the bone-in meat product.

Many techniques and products have been developed for preventing bone puncture or tear. U.S. Pat. No. 6,171,627 to Bert discloses a bag arrangement and packaging method for packaging bone-in meat using two bags to provide a double wall of film surrounding the cut of meat for bone puncture resistance.

U.S. Pat. No. 6,015,235 to Kraimer discloses a puncture resistant barrier pouch for the packaging of bone-in meat and other products.

U.S. Pat. No. 6,183,791 to Williams discloses an oriented heat-shrinkable, thermoplastic vacuum bag having a protective heat-shrinkable patch wherein the heat-shrinkable patch substantially covers all areas exposed to bone, thereby protecting the bag from puncture.

U.S. Pat. No. 5,020,922 to Schirmer discloses a seamless puncture resistant bag which includes a length of lay-flat seamless tubular film folded to a double lay-flat configuration. The configuration forms a seamless envelope with one face thickened integrally to triple thickness.

U.S. Pat. No. 5,534,276 to Ennis discloses an oriented heat-shrinkable, thermoplastic vacuum bag having a protective heat-shrinkable reverse printed patch attached to the bag.

The art teaches many techniques for addressing the problem of bone puncture or tear in the packaging of bone-in meat products. Many of the solutions typically include a film structure or bag having patches, double-walled thicknesses or the like. However, a need exists for multilayer structures that may be utilized for packaging bone-in meat products and other like products that have sufficient durability, strength, and puncture resistance so as to keep the multilayer structures from being punctured by bony protrusions from the meat, and yet is heat-sealable so as to form packaging that can seal to themselves or other structures. In addition, there exists a need in the art for economical and commercially viable multilayer structures to form heat-sealable and heat-shrinkable packages for bone-in meat products.

One solution for packaging bone-in meat entails the utilization of coextruded multilayer structures having sufficient strength, durability, tear resistance, puncture resistance, and optical properties. However, the formation of coextruded multilayer structures having these properties is difficult without laminating the structures to provide double-walled structures and/or laminating or otherwise adhering patches to the structures. Laminating structures together to form double-walled structures or otherwise adhering patches to the structures requires multiple complicated processes, thereby requiring additional time and money.

For example, known coextruded structures that may be useful for the present invention require very thick coextrusions to provide adequate puncture resistance for bone-in meat. This requires the use of large quantities of fairly expensive polymeric materials to provide the protection against puncture and tearing. This problem is typically solved, as noted above, by laminating structures together to form patches in the areas of the structures most susceptible to breaking or puncturing. These patches, while allowing the use of less thermoplastic material, can be unsightly in that the surface of the films are interrupted by the patches. In addition, the lamination process of adding the patches to the films can cause decreased optical characteristics, in that patches can become hazy or yellow. Moreover, the areas of the patches also suffer from decreased optical properties due to the thicknesses of the patches and the patches tend to interfere with the shrink characteristics of the structures. Still further, the application of the patches requires extra steps in addition to the steps of making the structures, including precisely positioning the patches where bony protrusions are likely to be.

In addition, many coextruded structures having the durability and strength to package bone-in meat have sealability problems. As noted above, the structures must be fairly thick to provide adequate puncture resistance. Typically, heat-sealing bars are utilized to seal the structures together. If a structure is too thick, the sealing bars will have difficulty in transferring an adequate amount of heat to the heat-sealing layers to melt the heat-sealing layers of the structures to provide adequate heat-seals. Inadequate heat-seals cause leaks, thereby exposing products contained within packages made from the structures to both oxygen and moisture, which may deleteriously affect the products.

In addition, thicker structures tend to have a decrease in optical properties compared to relatively thinner structures. A structure's thickness is directly related to haze. Thicker structures, therefore, tend to have an increase in haze, thereby contributing to a decrease in the clarity of the structures. In addition, thicker structures tend to be more difficult to orient. Thicker structures tend to have a lower shrink energy, thereby requiring an increase in orientation ratio to provide similar shrink characteristics as compared to thinner structures.

A need, therefore, exists for coextruded multilayer structures having superior strength, durability, tear resistance and puncture resistance that are significantly thinner than known structures while maintaining superior optical properties, such as low haze, low yellowness, and high clarity. In addition, a need exists for coextruded multilayer structures that are orientable to provide packages that are heat shrinkable around products. In addition, coextruded multilayer structures are needed having superior sealability as compared to known structures, while still maintaining the superior strength, durability, puncture resistance, tear resistance and optical properties. In addition, methods of making the multilayer structures and packages made therefrom are needed.

SUMMARY

Multilayer structures, methods of making the same and packages made therefrom useful for packaging products, such as bone-in meat, cheese and other like products are provided. More specifically, the present invention relates to multilayer structures, methods of making the same, and packages made therefrom useful for bone-in meat packaging, cook-in packaging, shrink film packaging, packaging for case ready meats, hot-fill applications, pet food, retort or lidding, and other like packaging. The multilayer structures are coextruded and have sufficient durability, strength, tear resistance and puncture resistance, while also providing oxygen barrier protection. In addition, the present invention relates to multilayer barrier structures, methods of making the same, and packages made therefrom useful for packaging that is biaxially oriented so as to be heat-shrinkable around products.

Multilayer structures, methods of making the same and packages made therefrom are provided. More specifically, the multilayer structures can be utilized for packaging products having bony protrusions or the like that would easily tear or puncture other structures.

To this end, in an embodiment of the present invention, a multilayer structure for packaging bone-in meat is provided. The multilayer structure comprises an outer layer comprising a blend of linear low density polyethylene and low density polyethylene, a first polyamide layer comprising a blend of between about 70% by weight and about 99% by weight semi-crystalline polyamide and about 1% by weight to about 30% by weight amorphous polyamide, a first tie layer disposed between said outer layer and said first polyamide layer, a barrier layer disposed adjacent said first polyamide layer wherein said barrier layer comprises ethylene vinyl alcohol copolymer having an ethylene content of between about 27 mol % and about 42 mol %, a second polyamide layer disposed adjacent said barrier layer comprising a blend of between about 70% by weight and about 99% by weight semi-crystalline polyamide, and between about 1% by weight and about 30% by weight amorphous polyamide, a sealant layer comprising a blend of linear low density polyethylene and low density polyethylene wherein said sealant layer comprises a greater volume percent than said outer layer, and a second tie layer disposed between said sealant layer and said second polyamide layer.

Moreover, the first and second polyamide layers each may comprise a blend of between about 85% by weight and about 99% by weight semi-crystalline polyamide and between about 1% by weight and about 15% by weight amorphous polyamide. Alternatively, said first and second polyamide layers each may comprise a blend of between about 60% by weight and about 80% by weight of a first semi-crystalline polyamide, between about 10% by weight and about 30% by weight of a second semi-crystalline polyamide, and between about 1% by weight and about 30% by weight amorphous polyamide. The first and said second polyamide layers may comprise about an equal percent by volume of the multilayer structure.

In addition, the outer layer may be between about 15% by volume and about 20% by volume of the multilayer structure and the heat sealant layer may be between about 25% by volume and about 30% by volume of the multilayer structure.

In addition, the multilayer structure may be oriented. Further, the multilayer structure may be annealed. Still further, the multilayer structure may be moisturized by the application of water to said multilayer structure. The multilayer structure may further be plasticized. In addition, the multilayer structure may be irradiated to promote crosslinking between the layers of said multilayer structure and/or within a layer of said multilayer structure.

Further, all layers of the multilayer structure of the present embodiment may be coextruded to form said multilayer structure. Preferably, the multilayer structure may be between about 1 mil and about 8 mils thick. Most preferably, the multilayer structure may be between about 1.5 mils and about 5 mils thick.

In an alternate embodiment of the present invention, a package for bone-in meat is provided. The package comprises a first wall comprising a multilayer structure comprising an outer layer comprising a blend of linear low density polyethylene and low density polyethylene; a first polyamide layer comprising a blend of about 70% by weight to about 99% by weight semi-crystalline polyamide and about 1% by weight to about 30% by weight amorphous polyamide; a first tie layer disposed between said outer layer and said first polyamide layer; a barrier layer disposed adjacent to said first polyamide layer wherein said barrier layer comprises ethylene vinyl alcohol copolymer having an ethylene content of between about 27 mol % and about 42 mol %; a second polyamide layer disposed adjacent said barrier layer comprising a blend of about 70% by weight to about 99% by weight semi-crystalline polyamide and about 1% by weight to about 30% by weight amorphous polyamide; a sealant layer comprising a blend of linear low density polyethylene and low density polyethylene wherein said sealant layer comprises a greater volume percent than the outer layer; and a second tie layer disposed between said sealant layer and said second polyamide layer.

In addition, the package further comprises a bone-in meat product within the package and the multilayer structure may be heat-shrunk around said bone-in meat product.

The first and second polyamide layers each may comprise a blend of between about 85% by weight and about 99% by weight semi-crystalline polyamide and between about 1% by weight and about 15% by weight amorphous polyamide. Alternatively, the first and second polyamide layers each may comprise a blend of between about 60% by weight and about 80% by weight of a first semi-crystalline polyamide, between about 10% by weight and about 30% by of a second semi-crystalline polyamide, and between about 1% by weight and about 30% by weight amorphous polyamide. The first and second polyamide layers may comprise about an equal percent by volume of the multilayer structure.

In addition, the outer layer may be between about 15% by volume and about 20% by volume of the multilayer structure and the heat sealant layer may be between about 25% by volume and about 30% by volume of the multilayer structure.

In addition, the multilayer structure of the package of the present invention may be oriented and heat-shrinkable. Further, the multilayer structure may be annealed. Still further, the multilayer structure may be moisturized by the application of water to said multilayer structure. Moreover, the multilayer structure may be irradiated to promote crosslinking between the layers of said multilayer structure and/or within a layer of said multilayer structure. In addition, the multilayer structure may be plasticized and all the layers of the multilayer structure may be coextruded to form the multilayer structure.

Preferably, the multilayer structure of the package of the present invention may be between about 1 mil and about 8 mils thick. Most preferably, the multilayer structure of the package of the present embodiment may be between about 1.5 mils and about 5 mils thick. The package may further be in the form of a tube having a space therein for bone-in meat. Alternatively, the first wall may be heat-sealed to a second wall wherein the first wall and the second wall form a space for bone-in meat.

In another alternate embodiment of the present invention, a method of making a multilayer for packaging bone-in meat is provided. The method comprises the steps of coextruding a multilayer structure comprising an outer layer comprising a blend of linear low density polyethylene and low density polyethylene; a first polyamide layer comprising a blend of between about 70% by weight and about 99% by weight semi-crystalline polyamide and about 1% by weight to about 30% by weight amorphous polyamide; a first tie layer disposed between said outer layer and said first polyamide layer; a barrier layer disposed adjacent said first polyamide layer wherein said barrier layer comprises ethylene vinyl alcohol copolymer having an ethylene content of between about 27 mol % and about 42 mol %; a second polyamide layer disposed adjacent said barrier layer comprising a blend of between about 70% by weight and about 99% by weight semi-crystalline polyamide, and between about 1% by weight and about 30% by weight amorphous polyamide; a sealant layer comprising a blend of linear low density polyethylene and low density polyethylene wherein said sealant layer comprises a greater volume percent of the multilayer structure than the outer layer; and a second tie layer disposed between said sealant layer and said second polyamide layer; and biaxially orienting said multilayer structure.

In addition, the outer layer may be between about 15% by volume and about 20% by volume of the multilayer structure and the heat sealant layer may be between about 25% by volume and about 30% by volume of the multilayer structure.

The method of the present embodiment further comprises the step of annealing said multilayer structure. Still further, the method of the present embodiment comprises the step of irradiating said multilayer structure to promote crosslinking between the layers of said multilayer structure and/or within a layer of said multilayer structure. The method further comprises the step of moisturizing said multilayer structure by applying water to said multilayer structure.

Preferably, the multilayer structure of the method of the present embodiment may be between about 1 mil and about 8 mils thick. Most preferably, the multilayer structure of the method of the present embodiment may be between about 1.5 mils and about 5 mils thick.

Multilayer structures and packages made from multilayer structures are provided that can be economically and cost-effectively manufactured. More specifically, the multilayer structures can be made via coextrusion of the layers together. The multilayer structures are, therefore, easy to produce and can be made quickly and efficiently.

In addition, multilayer structures and packages made from the multilayer structures are provided that can be oriented, thereby providing increased strength, especially when utilized as packaging for bone-in meat products and the like.

Moreover, multilayer structures, methods of making the same and package made therefrom are provided wherein the multilayer structures have superior strength, durability, tear resistance and puncture resistance while being significantly thinner than known structures having comparable strength, durability, tear resistance and puncture resistance. Thinner coextruded multilayer structures have the additional advantages of having superior optical properties, such as low haze and yellowness. In addition, thinner coextruded multilayer structures have the additional advantage of being easily heat-sealable and heat-shrinkable. Still further, thinner structures contribute to the utilization of less materials, which contributes to cost efficiencies and to a reduction of waste products, both during production of the structures, and after the structures are utilized for packages. For example, the multilayer structures described herein use less materials, thereby contributing to an overall decrease in materials required to be shipped and stored. Less materials contributes to a reduction in waste products as well, thereby reducing the impact to the environment. Moreover, less boxes, pallets and warehouse space is therefore required. In addition, the decrease in materials utilized further allows more packages to be shipped and stored in specific areas, such as in truckloads and the like.

In addition, multilayer structures, methods of making the same, and packages made therefrom are provided wherein the multilayer structures have increased stiffness.

Still further, multilayer structures, methods of making the same and packages made therefrom are provided made from multilayer structures having improved durability, strength, tear resistance and puncture resistance that may be made by a coextrusion process, without needing extra series of steps for laminating other structures thereto. Therefore, multilayer structures are provided that may be formed into packages that do not have double walls or patches. In addition, the multilayer structures provided herein do not require the extra steps, time and money to precisely position patches to strengthen a structure where bony protrusions and the like may damage the structure.

Additional features and advantages of the present invention are described in, and will be apparent from, the detailed description of the presently preferred embodiments and from the drawing.

BRIEF DESCRIPTION OF THE DRAWING

FIG. 1 illustrates a cross-sectional view of a seven-layer structure in an embodiment of the present invention.

DETAILED DESCRIPTION OF THE PRESENTLY PREFERRED EMBODIMENTS

Multilayer structures, methods of making the same and packages made therefrom are provided wherein the multilayer structures are useful for packaging meat products having bony protrusions and other like products having sharp protrusions. The bony protrusions make it difficult to utilize structures without some form of reinforcing material, such as a double-walled film structure or patches or the like. However, it has been found that a multilayer coextruded structure made without double-walling or without the use of patches may be formed that has sufficient rigidity, strength, tear resistance and puncture resistance to hold bone-in meat products, while also protecting the products from the deleterious effects of oxygen.

The multilayer structures of the present invention typically have at least one layer of nylon and a heat-sealant layer that preferably allows the film to be heat-sealed to itself or to another film to form a package having a space therein for bone-in meat. The packages made from the multilayer structures further comprise an oxygen barrier layer to protect the product contained therein from the deleterious effects of oxygen.

For purposes of describing the layers of the thermoplastic multilayer barrier structures described herein, the term "inner layer" refers to the layer of a package made from the coextruded multilayer structure that directly contacts the inner space of the package and/or directly contacts the product contained therein, especially when heat-shrunk around the product, as described in more detail below. The term "outer layer" refers to a layer of the coextruded multilayer structure disposed on the external surface thereof. Specifically, if a package is made from a non-laminated coextruded structure, the outer layer is disposed on the external surface of the package.

Typically, the outer layer of the multilayer structures provides rigidity and strength to the film, and further provides protection from punctures, tears and the like, and is often referred to as an "abuse layer". Materials that may be useful in the outer layer are those typically used for abuse layers in multilayer structures, such as low density polyethylene ("LDPE"), or heterogeneous or homogeneous ethylene alpha-olefin copolymers, such as linear low density polyethylene ("LLDPE") and medium density polyethylene ("MDPE") made by typical polymeric processes, such as Ziegler-Natta catalysis and metallocene-based catalysis. Moreover, other ethylene copolymers may be utilized as well, such as ethylene vinyl acetate copolymer ("EVA") and ethylene methyl acrylate copolymer ("EMA"). Other materials may include polypropylene ("PP"), polyamides, ionomers, polyesters or blends of any of these materials. In addition, an amount of slip and/or antiblock may be added to aid the outer layer in forming and to provide desirable characteristics.

Preferably, the outer layer comprises a blend of octene-based LLDPE and LDPE. A preferable range of LLDPE and LDPE utilized in the outer layer may be between about 50% by weight and about 90% by weight LLDPE and about 10% by weight and about 50% by weight LDPE. Most preferably, the blend of LLDPE and LDPE may be about 70% by weight LLDPE and about 30% by weight LDPE. In addition, the blend of the outer layer may comprise a small amount of antiblock and/or slip agent. Alternatively, the outer layer may comprise a polyamide or blend of polyamide materials.

In addition, the coextruded multilayer structures of the present invention typically have at least one internal layer. An "internal layer" is a layer disposed within a multilayer structure, and is bonded on both sides to other layers. A preferred material that is useful as an internal layer is a polyamide. Generally, polyamide materials that are useful for the at least one internal layer include, but are not limited to, nylon 6, nylon 6,69, nylon 6,66, nylon 12, nylon 6,12, nylon 6,IPD,I, amorphous polyamide, or blends of any of these materials. Preferably, the at least one internal layer is a blend of polyamide materials, such as, for example, a blend of semi-crystalline polyamide and amorphous polyamide, although amorphous polyamide is not necessary in the at least one internal layer.

For example, the internal layer may comprise nylon 6 or nylon 6,66 and amorphous polyamide, or a blend of nylon 6, nylon 6,69 and amorphous polyamide. It is preferable to utilize a blend of a large amount of semi-crystalline polyamide, such as about 70% by weight to about 99% by weight semi-crystalline polyamide, such as nylon 6 or nylon 6,66 or a blend of nylon 6 and nylon 6,69, with a small amount of amorphous polyamide, such as between about 1% by weight and about 30% by weight amorphous polyamide. More preferably, the internal layer may comprise about 85% by weight to about 99% by weight semi-crystalline polyamide, such as nylon 6 or nylon 6,66 or a blend of nylon 6 and nylon 6,69, with about 1% by weight to about 15% by weight amorphous polyamide. Most preferably, the internal layer may comprise about 90% by weight to about 99% by weight semi-crystalline polyamide and about 1% by weight and about 10% by weight amorphous polyamide.

In addition, the polyamide layers of the present invention may comprise a blend of a first semi-crystalline polyamide, a second semi-crystalline polyamide, and an amorphous polyamide. Specifically, the polyamide layers may comprise between about 60% by weight and about 80% by weight of the first semi-crystalline polyamide, between about 10% by weight and about 30% by weight of the second semi-crystalline polyamide, and between about 1% by weight and about 30% by weight of the amorphous polyamide.

The blends described herein allow the internal layer of polyamide to retain softness and ease of processability while still imparting high puncture resistance, strength and stiffness to the film structure. In addition, polyamide blends comprising a small amount of amorphous polyamide have improved orientation and, therefore, shrink characteristics. Specifically, a small amount of amorphous polyamide in the polyamide blend with semi-crystalline polyamide improves both out-of-line orientation and in-line orientation.

Alternatively, the coextruded multilayer structures of the present invention may have a plurality of polyamide layers. For example, structures may have an outer layer comprising polyamide and an internal layer comprising polyamide. Alternatively, the structures may have two or more internal layers of polyamide. The two or more layers of polyamide may preferably be separated by an internal core layer, such as an oxygen barrier layer, as described below, and may further be useful in bonding the oxygen barrier layer to other layers within the multilayer structure. In one embodiment of the present invention, the two or more layers of polyamide may be the same polyamide. In another embodiment, the two layers may be different. Preferably, the two or more layers of polyamide are identical, such as an identical blend of semi-crystalline polyamide and amorphous polyamide.

Further, the internal core layer of the present invention may be a barrier layer to provide protection from oxygen that may deleteriously affect oxygen-sensitive products that may be contained within packages made by the coextruded multilayer structures of the present invention, such as bone-in meat products. Materials that may be utilized as the barrier layers of the structures include, but are not limited to, ethylene vinyl alcohol copolymer (EVOH) and EVOH blends, such as EVOH blended with polyamide, EVOH blended with polyolefin, such as LLDPE, EVOH blended with ionomer, polyglycolic acid, blends thereof and other like oxygen barrier materials. Other barrier materials may include amorphous polyamide and polyvinylidene chloride-methyl acrylate copolymer.

A preferable EVOH material utilized in the structures described herein has an ethylene content of between about 24 mol % and about 52 mol %. More preferably, the EVOH material utilized in the structures of the present invention have an ethylene content of between about 27 mol % and about 42 mol %. The decreased ethylene content of EVOH copolymers allows the structures to have greater barrier protection at relative humidity of less than about 93%.

The multilayer structures of the present invention may further have a heat-sealant layer that may form heat-seals when heat and/or pressure is applied to the package. For example, the structures of the present invention may be folded over onto themselves and sealed around edges to create a package with the bone-in meat products contained therein. Alternatively, the structures may be formed as a tube, whereby ends of the tube may be heat-sealed together to create a package for the product. Moreover, a first structure of the present invention may be disposed adjacent a second structure of the present invention and sealed around edges of the structures to form a package for the bone-in meat or other like products.

The heat-sealant layer materials include, but are not limited to, various polyolefins, such as low density polyethylene, linear low density polyethylene and medium density polyethylene. The polyethylenes may be made via a single site catalyst, such as a metallocene catalyst, or a Ziegler-Natta catalyst, or any other polyolefin catalyst system. In addition, other materials include, but are not limited to, polypropylene, ionomer, propylene-ethylene copolymer or blends of any of these materials. Further, acid modified polyolefins and tie resins or concentrates, such as, for example, anhydride modified polyethylene, may be utilized in the heat sealant layer, which may be useful for meat adhesion when the multilayer structure is heat shrunk about a bone-in meat product.

In addition, slip and/or antiblock may be added to the polymeric material to aid in processability and for other desirable characteristics. Preferably, the heat-sealant layer of the structure of the present invention may comprise a blend of octene-based linear low density polyethylene and low density polyethylene. More specifically, the heat-sealant layer may comprise between about 50% by weight and about 90% by weight LLDPE and between about 10% by weight and about 50% by weight LDPE. Most specifically, the heat-sealant layer comprises about 70% by weight LLDPE and about 30% by weight LDPE. Optionally, the heat-sealant layer comprises a small amount of slip and/or antiblock.

The above-identified materials may be combined into a structure having at least three layers that has sufficient puncture resistance, strength and optical properties to form packages that are useful for packaging bone-in meat or other like products.

The coextruded multilayer structures of the present invention are preferably coextruded and biaxially oriented via a double bubble process, whereby each layer of each of the multilayer structures is coextruded as a bubble and then cooled. Typical cooling processes include air cooling, water cooling or cooling via non-contact vacuum sizing. The coextruded multilayer structures may then be reheated and oriented in both the longitudinal and transverse directions. Alternatively, the coextruded multilayer structures of the present invention may be oriented via other orienting processes, such as tenter-frame orientation.

The oriented multilayer structures are then heated to an annealing temperature and cooled while the multilayer structures maintain their oriented dimensions in a third bubble, thereby annealing the multilayer structures to relax residual stress and provide stability and strength to the multilayer structures while maintaining the heat shrinkability and superior optical characteristics of oriented multilayer structures. Use of a third bubble for purposes of annealing the oriented structures is often referred to as a triple-bubble process. The structures of the present invention may be partially or completely annealed. Annealing the multilayer structure allows for precise control over the degree of shrink and/or over the stability of the multilayer structure, and is typically done at a temperature between room temperature and the anticipated temperature at which the multilayer structure is desired to shrink.

In addition, the multilayer structures of the present invention may be further processed to get desirable characteristics. For example, multilayer structures of the present invention may be cross-linked via known cross-linking processes, such as by electron-beam cross-linking either before or after orientation of the multilayer structure. Cross-linking may occur between layers ("inter-layer crosslinking") of the structures or molecularly within at least one layer of a structure ("molecular cross-linking"). For example, molecular cross-linking of EVOH occurs at about 6 megarads, which provides increased stiffness and barrier properties of the EVOH in the structures. Of course, any other radiation dosage may be utilized to promote inter-layer cross-linking or molecular cross-linking as may be apparent to one having ordinary skill in the art. In addition, the structures may be moisturized, by exposing the surfaces of the structures to water so that certain layers of the structures, such as the polyamide layers, absorb the water thus plasticizing the polyamide layers, thereby making the polyamide layers softer and stronger. Moisturizing the structures typically occurs by exposing the surface of the structures to water, such as a mist, prior to rolling the structures for storage. During storage of the structures, the water is absorbed by the layers of the structures, such as the polyamide layers, thereby plasticizing the structure. Of course, other methods for plasticizing the structures are contemplated by the present invention, and the invention should not be limited as described herein.

Preferably, the structures of the present invention have a thickness of between about 1 and about 8 mils. Most preferably, the structures of the present invention have a thickness of between about 1.5 mils and about 5 mils. A balance must be reached between having a cost-effective package, thereby minimizing the thickness of the structures, and having a package that provides adequate puncture and tear resistance for bone-in meat or other like products. It is believed that a combination of materials used in the structures contributes to the advantageous properties of the structures of the present invention, such as puncture resistance, strength, durability, and optical properties, without requiring relatively thick structures.

The structures of the present invention are utilized to make heat shrinkable bags, such as by coextruding heat shrinkable tubes, cutting said tubes to the desired sizes, placing product within said tubes, sealing the open ends of the tubes, and heat-shrinking the tubes around the products. Alternatively, packages may be made by folding structures so that the heat-sealant layers of the structures are in face-to-face contact. In addition, packages may be made by heat-sealing first walls of first multilayer structures to second walls of second multilayer structures to form a space for a product to be contained therein. Of course, any other method of making said packages are contemplated by the present invention. Machinery contemplated as being used to make the bags or packages of the present invention include intermittent motion bag-making machines, rotary bag-making machines, or multibaggers, which are described in U.S. Pat. No. 6,267,661 to Melville, the disclosure of which is expressly incorporated herein in its entirety.

In a typical bag-making process, tubes are produced using a double-bubble or a triple-bubble process, as described above. The surfaces of the tubes may be lightly dusted with starch. An open end of the tube is then heat-sealed with one end of the tube left open for adding the product to the package. Other types of packages and uses are contemplated by the present invention, such as vertical form, fill and seal packages and lidstock for rigid or semi-rigid trays. In addition, the structures of the present invention may be useful as cook-in bags or the like.

The tubes then have product placed therein, such as bone-in meat. The tubes are then evacuated of air and the open end of each is heat-sealed. The tubes that have been evacuated of air and heat-sealed are then shrunk around the product by sending the tubes through an oven, a hot water tunnel or other similar heat-shrink apparatus.

As noted above, the structures of the present invention may have at least three layers, but preferably contain four, five, six or more layers. Most preferably, the structures comprise seven layers. In addition, structures having greater than seven layers are contemplated by the present invention. Each structure preferably has a heat-sealant layer, a polyamide layer, and a barrier layer of, preferably, EVOH copolymer. Moreover, it is preferable to have at least two layers of polyamide contained within each of the structures disposed on opposite sides of the barrier layer thereby bonding the barrier layer to the other layers within each of the multilayer structures.

The following non-limiting examples illustrate five-layer structures of the present invention:

EXAMPLE 1

| Structure Layer | Percent by volume of structure | Materials and percent by weight of layer |
|---|---|---|
| 1 (Outer layer) | 45 | 80% Nylon 6 |
| | | 20% amorphous polyamide |
| 2 (Barrier layer) | 5 | 100% EVOH |
| | | (32 mol % ethylene content) |
| 3 (Polyamide layer) | 35 | 90% Nylon 6 |
| | | 10% amorphous polyamide |
| 4 (Tie layer) | 5 | 100% anhydride modified LLDPE |
| 5 (Sealant layer) | 10 | 50% LLDPE |
| | | 50% LDPE |

EXAMPLE 2

| Structure Layer | Percent by volume of structure | Materials and percent by weight of layer |
|---|---|---|
| 1 (Outer layer) | 45 | 80% Nylon 6 |
| | | 20% amorphous polyamide |
| 2 (Barrier layer) | 5 | 100% EVOH |
| | | (44 mol % ethylene content) |
| 3 (Polyamide layer) | 35 | 90% Nylon 6 |
| | | 10% amorphous polyamide |
| 4 (Tie layer) | 5 | 100% anhydride modified LLDPE |
| 5 (Sealant layer) | 10 | 50% LLDPE |
| | | 50% LDPE |

Examples 1-2 illustrate five-layer structures of the present invention. Specifically, the five-layer structures each comprise an outer layer of polyamide, a barrier layer of EVOH copolymer, an internal layer of polyamide, such that the outer layer of polyamide and the internal layer of polyamide are disposed adjacent to the barrier layer of EVOH copolymer. A tie layer is disposed adjacent to the internal layer of polyamide, which binds the internal layer of polyamide to the heat-sealant layer, comprising a blend of LLDPE and LDPE. The 5-layer structures of Examples 1 and 2 were about 4.1 mils thick.

EXAMPLE 3

Example 3 includes the 5-layer structure of Example 2 that was moisturized by the application of water to the structure, thereby plasticizing the structure. Specifically, the water was applied as a mist or spray to the 5-layer structure of Example 2, and the 5-layer structure of Example 2 was wound on a roll and the water was allowed to penetrate the film structure to plasticize the film structure, specifically the polyamide layers. The 5-layer moisturized structure of Example 3 was about 5.6 mils thick.

Table 1 illustrates comparative test data for Examples 1-3.

TABLE 1

| Test | Ex. 1 | Ex. 2 | Ex. 3 |
|---|---|---|---|
| Caliper (mil) | 4.1 | 4.1 | 5.6 |
| 45° Gloss (units) | 90.2 | 92.2 | 70.1 |
| Haze (%) | 4.0 | 3.6 | 9.0 |
| Yellowness Index | 1.1 | 1.1 | 1.1 |
| MD Secant Modulus (psi) | 237,900 | 243,900 | 32,200 |
| CD Secant Modulus (psi) | 250,800 | 246,800 | 36,400 |
| Puncture Resistance (lb/mil) | 21.2 | 22.2 | 11.5 |
| MD Free Shrink @200° F. | 19 | 18 | 19 |
| CD Free Shrink @200° F. | 28 | 28 | 20 |
| OTR @ 73° F./0% RH (cc/m$^2$/day/atm) | 0.8 | 2.4 | — |

In a preferred embodiment of the present invention, seven-layer coextruded structures are provided, as illustrated in FIG. 1. The structures preferably comprise a first outer layer 10, a first tie layer 12, a first polyamide layer 14, a barrier layer 16, a second polyamide layer 18, a second tie layer 20 and a heat-sealant layer 22. Each of the layers is described in more detail below.

The outer layer 10 of the seven-layer structure illustrated in FIG. 2 provides rigidity and strength to the structure, and further provides protection from scratches, tears and the like. Preferably, the outer layer 10 is between about 5% by volume and about 25% by volume of the entire structure.

Most preferably, the outer layer 10 comprises about 17.5% by volume of the entire structure.

The multilayer structures of the present invention may further comprise tie layers disposed between other layers of the multilayer structures. Specifically, a "tie layer" is defined as an internal layer that provides adhesion or bonding to two layers of a coextruded structure and is typically disposed adjacent to and between the two layers of the coextruded structure. The multilayer structure 1 described with reference to FIG. 1 may include a first tie layer 12 and a second tie layer 20, which are disposed adjacent the outer layer 10 and the heat-sealant layer 22, respectively. The first and second tie layers may be utilized to bind the outer layer 10 and the heat-sealant layer 22 to other internal layers, such as the first polyamide layer 14 and/or second polyamide layer 18. The first tie layer 12 and/or second tie layer 20 may comprise modified polyolefins, such as maleic anhydride modified polyolefins. Polyolefins useful as the first tie layer 12 and/or the second tie layer 20 of the present invention include, but are not limited to, anhydride modified linear low density polyethylene or any other maleic anhydride modified polyolefin polymer or copolymer, such as anhydride modified ethylene-vinyl acetate copolymer and/or anhydride modified ethylene methyl acrylate copolymer. Alternatively, the first tie layer 12 and/or the second tie layer 20 may comprise a material that is not typically utilized as a tie resin. Specifically, the first tie layer 12 and/or the second tie layer 20 may comprise materials that are not modified with maleic anhydride, such as ethylene vinyl acetate copolymer and ethylene methyl acrylate copolymer. Other polymeric materials that may be useful as tie layers include, but are not limited to, acid terpolymer comprising ethylene, acrylic acid and methyl acrylate, polyamide, and polystyrene block copolymers. In addition, the first tie layer 12 and/or the second tie layer 20 may comprise blends of tie resins with other polymeric material, such as polyolefins or the like.

Preferably, the first tie layer 12 and/or the second tie layer 20 comprise a maleic anhydride modified ethylene methyl acrylate copolymer, such as, for example, BYNEL® from DuPont. Most preferably, the first tie layer comprises maleic anhydride modified linear low density polyethylene, such as, for example, ADMER® from Mitsui. It should be noted that the first tie layer 12 and the second tie layer 20 may not be the same material, but may be different materials that are useful for tying together the outer layer 10 to an internal layer of polyamide and/or the sealant layer 22 to an internal layer of polyamide. Although the first tie layer 12 and second tie layer 20 may be any thickness useful for the present invention, it is preferable that the first tie layer 12 and second tie layer 20 each comprise between about 2% by volume and about 15% by volume of the multilayer structures. Most preferably, the first tie layer 12 and/or the second tie layer 20 each comprise about 5% by volume of the entire multilayer structures.

The first polyamide layer 14 and/or second polyamide layer 18 may be utilized to protect the barrier layer 16, and to provide rigidity and strength to structures made from the present invention. The polyamide layers further provide ease of orientation, better shrink force and lower oxygen transmission rates through the multilayer structure. It should be noted that the first polyamide layer 14 and second polyamide layer 18 may not be the same material, and may be different depending on the desired characteristics of the structures. In addition, each of the first polyamide layer 14 and/or second polyamide layer 18 of the seven layer structures may be between about 10% by volume and about 60% by volume of the structures More specifically, each of the polyamide layers of the seven layer structures may be between about 10% by volume and about 40% by volume of the structures. Most preferably, each of the polyamide layers of the seven layer structures may be between about 15% and about 25% by volume of the structures.

Both the first polyamide layer 14 and second polyamide layer 18 may together comprise between about 20% by volume and about 80% by volume of the structures. More specifically, both the first polyamide layer 14 and second polyamide layer 18 may together comprise between about 30% by volume and about 50% by volume of the structures. Most preferably, both of the first polyamide layer 14 and second polyamide layer 18 may together comprise about 40% by volume of the film. While it is preferable that the two polyamide layers 14, 18 be of the same thickness, this is not necessary, and the first polyamide layer 14 and the second polyamide layer 18 may be different thicknesses.

The heat-sealant layer 22 of the seven layer structure illustrated in FIG. 1 may be any thickness. Preferably, the heat-sealant layer may comprise between about 20% by volume and about 30% by volume of the entire structure. Most preferably, the heat-sealant layer 22 of the present invention may comprise about 27.5% by volume of the entire structure, especially when the outer layer 10 comprises about 17.5% by volume of the entire structure. It is further preferable that the outer layer 10 and the heat-sealant layer 22 comprise different amounts of polymeric material, thereby creating an unbalanced structure. If the outer layer 10 is thinner than the heat-sealant layer 22, then the entire structure will be thinner, thereby allowing a heat-sealing mechanism such as a heat-sealing bar, to heat the sealant layer 22 and more easily and effectively melt the sealant layer 22 to form a heat-seal. In addition, having more polymeric material in the heat-sealant layer 22 allows the heat-sealant layer 22 to more easily melt and flow, thereby forming a strong seal when heat-sealed to another structure or to itself.

The seven-layer structures of the present invention, as described above and illustrated in FIG. 1, are preferably coextruded and oriented thereby producing structures that are heat shrinkable. The total orientation factor of the seven-layer structures are preferably between about 6 and about 20. More preferably, the total orientation factor is between about 8 and about 13. The structures of the present invention may further be partially or completely annealed, preferably at a temperature of between room temperature and the temperature at which the structure is heat shrunk. Annealing the structures stabilizes the structures by removing residual stresses within the oriented structures. Typically, the structures are maintained in a third bubble and heated above their annealing temperatures, which allows residual stresses in the oriented structures to relax, thereby providing more stable multilayer structures.

The following examples illustrate specific embodiments of seven layer structures:

EXAMPLE 4

| Structure Layer | Percent by volume of structure | Materials and percent by weight of structure layer |
| --- | --- | --- |
| 1 (Outer) | 22.5 | 49% LLDPE<br>49% LDPE<br>2% blend of slip and antiblock |

| Structure Layer | Percent by volume of structure | Materials and percent by weight of structure layer |
| --- | --- | --- |
| 2 (First Tie) | 5.0 | 100% anhydride modified LLDPE |
| 3 (First Polyamide) | 20.0 | 70% nylon 6<br>25% nylon 6.69<br>5% amorphous polyamide |
| 4 (Barrier) | 5.0 | 100% EVOH<br>(48 mol % ethylene content) |
| 5 (Second Polyamide) | 20.0 | 70% nylon 6<br>25% nylon 6.69<br>5% amorphous polyamide |
| 6 (Second Tie) | 5.0 | 100% anhydride modified LLDPE |
| 7 (Sealant) | 22.5 | 49% LLDPE<br>49% LDPE<br>2% blend of slip and antiblock |

The seven layer structure of Example 4 was made by coextruding the seven layers together and biaxially orienting the resulting structure. The seven layer structure has a total orientation factor of about 11.7. Further, the structure was annealed to stabilize the structure. The coextrusion, orientation, and annealing of the seven layer structure of Example 4 were completed in a triple bubble process. The final structure thickness was about 3.3 mils.

EXAMPLE 5

| Structure Layer | Percent by volume of structure | Materials and percent by weight of structure layer |
| --- | --- | --- |
| 1 (Outer) | 17.5 | 49% LLDPE<br>49% LDPE<br>2% blend of slip and antiblock |
| 2 (First Tie) | 5.0 | 100% anhydride modified LLDPE |
| 3 (First Polyamide) | 20.0 | 70% nylon 6<br>25% nylon 6.69<br>5% amorphous polyamide |
| 4 (Barrier) | 5.0 | 100% EVOH<br>(48 mol % ethylene content) |
| 5 (Second Polyamide) | 20.0 | 70% nylon 6<br>25% nylon 6.69<br>5% amorphous polyamide |
| 6 (Second Tie) | 5.0 | 100% anhydride modified LLDPE |
| 7 (Sealant) | 27.5 | 49% LLDPE<br>49% LDPE<br>2% blend of slip and antiblock |

The seven-layer structure of Example 5 was made by coextruding the seven layers together and biaxially orienting the structure. The structure had a total orientation factor of about 11.4. In addition, the seven-layer structure of Example 5 was annealed to stabilize the final structure. The coextrusion, orientation, and annealing of the seven layer structure of Example 5 were completed in a triple bubble process. The final structure thickness was about 3.7 mils.

This structure of Example 5 is similar to the structure described in Example 4, except that the structure of Example 5 contains differing amounts of materials in the outer layer and the heat-sealant layer thereby creating an unbalanced structure. Specifically, the outer layer comprises about 17.5% by volume of the structure, and the sealant layer comprises about 27.5% by volume of the structure.

EXAMPLE 6

| Structure Layer | Percent by volume of structure | Materials and percent by weight of structure layer |
| --- | --- | --- |
| 1 (Outer) | 15.0 | 49% LLDPE<br>49% LDPE<br>2% blend of slip and antiblock |
| 2 (First Tie) | 5.0 | 100% anhydride modified LLDPE |
| 3 (First Polyamide) | 25.0 | 70% nylon 6<br>25% nylon 6.69<br>5% amorphous polyamide |
| 4 (Barrier) | 5.0 | 100% EVOH<br>(48 mol % ethylene content) |
| 5 (Second Polyamide) | 25.0 | 70% nylon 6<br>25% nylon 6.69<br>5% amorphous polyamide |
| 6 (Second Tie) | 5.0 | 100% anhydride modified LLDPE |
| 7 (Sealant) | 20.0 | 49% LLDPE<br>49% LDPE<br>2% blend of slip and antiblock |

The seven-layer structure of Example 6 was made by coextruding the seven layers together and biaxially orienting the structure. The structure had a total orientation factor of about 9.1. In addition, the seven layer structure of Example 6 was annealed to stabilize the final structure. The coextrusion, orientation, and annealing of the seven layer structure of Example 6 were completed in a triple bubble process. The final structure thickness was about 3.9 mils.

The seven-layer structure of Example 6 is similar to the seven-layer structure of Example 5, including differing amounts of materials in the outer layer and the heat-sealant layer. However, the structure of Example 6 includes more polyamide material than the structure of Example 5. More specifically, each polyamide layer in the structure of Example 6 comprises about 25% by volume of the structure. The entire structure comprises about 50% by volume total of polyamide.

EXAMPLE 7

| Structure Layer | Percent by volume of structure | Materials and percent by weight of structure layer |
| --- | --- | --- |
| 1 (Outer) | 17.5 | 49% LLDPE<br>49% LDPE<br>2% blend of slip and antiblock |
| 2 (First Tie) | 5.0 | 100% anhydride modified LLDPE |
| 3 (First Polyamide) | 20.0 | 70% nylon 6<br>25% nylon 6.69<br>5% amorphous polyamide |
| 4 (Barrier) | 5.0 | 100% EVOH<br>(32 mol % ethylene content) |
| 5 (Second Polyamide) | 20.0 | 70% nylon 6<br>25% nylon 6.69<br>5% amorphous polyamide |
| 6 (Second Tie) | 5.0 | 100% anhydride modified LLDPE |
| 7 (Sealant) | 27.5 | 49% LLDPE<br>49% LDPE<br>2% blend of slip and antiblock |

The seven-layer structure of Example 7 was made by coextruding the seven layers together and biaxially orienting the structure. The structure had a total orientation factor of about 11.2. In addition, the seven-layer structure of Example 7 was annealed to stabilize the final structure. The coextrusion, orientation, and annealing of the seven layer structure of Example 7 were completed in a triple bubble process. The final structure thickness was about 3.7 mils.

The seven-layer structure of Example 7 is almost identical to the seven-layer structures of Example 5, except that the core layer comprises EVOH having an ethylene content of about 32 mol %, as opposed to about 48 mol %, as shown above with respect to Example 5.

EXAMPLE 8

| Structure Layer | Percent by volume of structure | Materials and percent by weight of structure layer |
|---|---|---|
| 1 (Outer) | 17.5 | 49% LLDPE<br>49% LDPE<br>2% blend of slip and antiblock |
| 2 (First Tie) | 5.0 | 100% anhydride modified LLDPE |
| 3 (First Polyamide) | 20.0 | 92% nylon 6<br>8% amorphous polyamide |
| 4 (Barrier) | 5.0 | 100% EVOH<br>(38 mol % ethylene content) |
| 5 (Second Polyamide) | 20.0 | 92% nylon 6<br>8% amorphous polyamide |
| 6 (Second Tie) | 5.0 | 100% anhydride modified LLDPE |
| 7 (Sealant) | 27.5 | 49% LLDPE<br>49% LDPE<br>2% blend of slip and antiblock |

The seven-layer structure of Example 8 was made by coextruding the seven layers together and biaxially orienting the structure. In addition, the seven-layer structure of Example 8 was annealed to stabilize the final film. The coextrusion, orientation, and annealing of the seven layer structure of Example 8 were completed in a triple bubble process. The final structure thickness was about 4.0 mils. Each of the polyamide layers of the seven layer structure of Example 8 comprises a blend of about 92% by weight nylon 6 and about 8% by weight amorphous polyamide.

EXAMPLE 9

| Structure Layer | Percent by volume of structure | Materials and percent by weight of structure layer |
|---|---|---|
| 1 (Outer) | 17.5 | 69% LLDPE<br>29% LDPE<br>2% blend of slip and antiblock |
| 2 (First Tie) | 5.0 | 100% anhydride modified LLDPE |
| 3 (First Polyamide) | 20.0 | 92% nylon 6<br>8% amorphous polyamide |
| 4 (Barrier) | 5.0 | 100% EVOH<br>(32 mol % ethylene content) |
| 5 (Second Polyamide) | 20.0 | 92% nylon 6<br>8% amorphous polyamide |
| 6 (Second Tie) | 5.0 | 100% anhydride modified LLDPE |
| 7 (Sealant) | 27.5 | 68% LLDPE<br>27.25% LDPE<br>4.75% blend of slip, antiblock, anti-oxidant, and polymer processing aid |

The seven-layer structure of Example 9 was made by coextruding the seven layers together and biaxially orienting the structure. In addition, the seven-layer structure of Example 9 was annealed to stabilize the final film. The coextrusion, orientation, and annealing of the seven layer structure of Example 9 were completed in a triple bubble process. The final structure thickness was about 4.0 mils. Each of the polyamide layers of the seven layer structure of Example 9 comprises a blend of about 92% by weight nylon 6 and about 8% by weight amorphous polyamide.

Table 2 provide comparative test data for each of the Examples 4-9:

TABLE 2

| Test | Ex. 4 | Ex. 5 | Ex. 6 | Ex. 7 | Ex. 8 | Ex. 9 |
|---|---|---|---|---|---|---|
| Caliper (mil) | 3.6 | 3.4 | 3.5 | 3.7 | 4.0 | 3.85 |
| 45° Gloss (units) | 72.6 | 72.5 | 46 | 69.8 | 72.8 | 71.4 |
| Haze (%) | 7.8 | 10 | 25.7 | 9.6 | 7.9 | 8.6 |
| Yellowness Index | 0.16 | 0.19 | 0.12 | 0.20 | 0.22 | 0.13 |
| MD Secant Modulus (psi) | 111,500 | 130,400 | 145,200 | 132,700 | 131,900 | 121,500 |
| CD Secant Modulus (psi) | 120,300 | 131,900 | 160,000 | 144,800 | 157,400 | 156,000 |
| Puncture Resistance (lb/mil) | 16.8 | 17.9 | 21.9 | 14.5 | 18.2 | 15.3 |
| MD Free Shrink @200° F. | 24 | 25 | 26 | 26 | 24 | 28 |
| CD Free Shrink @200° F. | 30 | 29 | 35 | 30 | 29 | 29 |
| OTR @ 73° F./0% RH (cc/m$^2$/day/atm) | 11.3 | 14.4 | 11.2 | 1.8 | 2.0 | 3.1 |

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A package comprising a multilayer structure and a bone-in meat product, the multilayer structure comprising:
    an outer layer comprising polyethylene, wherein the volume percent of the outer layer is between 5% and 25% of the multilayer structure;
    a first polyamide layer, wherein said first polyamide layer comprises a blend of between 91% by weight and 99% by weight semi-crystalline polyamide and 1% by weight to 9% by weight amorphous polyamide, wherein the volume percent of the first polyamide layer is between 15% and 25% of the multilayer structure;

a first tie layer disposed between and in contact with each of said outer layer and said first polyamide layer, wherein the volume percent of the first tie layer is between 2% and 15% of the multilayer structure;

a barrier layer disposed in contact with said first polyamide layer wherein said barrier layer comprises ethylene vinyl alcohol copolymer having an ethylene content of between 27 mol % and 42 mol %;

a second polyamide layer disposed in contact with said barrier layer, wherein said second polyamide layer comprises a blend of between 91% by weight and 99% by weight semi-crystalline polyamide, and between 1% by weight and 9% by weight amorphous polyamide, wherein the volume percent of the second polyamide layer is between 15% and 25% of the multilayer structure;

a sealant layer, wherein the sealant layer comprises polyethylene, wherein the volume percent of the sealant is greater than the volume percent of the outer layer; and a second tie layer disposed between and in contact with each of said sealant layer and said second polyamide layer, wherein the volume percent of the second tie layer is between 2% and 15% of the multilayer structure, wherein the thickness of the multilayer structure is between 1.5 mils and 5 mils, wherein the multilayer structure is biaxially oriented, and the package comprises a bone-in meat product contained therein, where a bone of the bone-in meat product protrudes from the meat and contacts the multilayer structure, wherein the multilayer structure does not comprise a double wall or patch, is heat-shrinkable, annealed and has rigidity, strength, oxygen barrier and puncture resistance to hold the bone-in meat product.

2. The multilayer structure of claim 1 wherein said first and second polyamide layers each comprise a blend at least 68% by weight of a first semi-crystalline polyamide, at least 23% by weight of a second semi-crystalline polyamide.

3. The multilayer structure of claim 1 wherein said first and said second polyamide layers comprise an equal percent by volume of the multilayer structure.

4. The multilayer structure of claim 1 wherein the outer layer is between 15% by volume and 20% by volume of the multilayer structure and the sealant layer is between 25% by volume and 30% by volume of the multilayer structure.

5. The multilayer structure of claim 1 wherein the outer layer comprises linear low density polyethylene.

6. The multilayer structure of claim 1 wherein the sealant layer comprises linear low density polyethylene.

7. The multilayer structure of claim 1, wherein the outer layer and the sealant layer each comprise linear low density polyethylene.

8. A bone-in meat package comprising:

a first wall comprising a multilayer structure comprising an outer layer comprising polyethylene, wherein the volume percent of the outer layer is between 5% and 25% of the multilayer structure;

a first polyamide layer, wherein said first polyamide layer comprises a blend of 91% by weight to 99% by weight semi-crystalline polyamide and 1% by weight to 9% by weight amorphous polyamide, wherein the volume percent of the first polyamide layer is between 15% and 25% of the multilayer structure;

a first tie layer disposed between and in contact with each of said outer layer and said first polyamide layer, wherein the volume percent of the first tie layer is between 2% and 15% of the multilayer structure;

a barrier layer disposed in contact with said first polyamide layer wherein said barrier layer comprises ethylene vinyl alcohol copolymer having an ethylene content of between 27 mol % and 42 mol %;

a second polyamide layer disposed in contact with said barrier layer, wherein said second polyamide layer comprises a blend of 91% by weight to 99% by weight semi-crystalline polyamide and 1% by weight to 9% by weight amorphous polyamide, wherein the volume percent of the second polyamide layer is between 15% and 25% of the multilayer structure;

a sealant layer, wherein said sealant layer comprises polyethylene wherein the volume percent of the sealant layer is greater than the volume percent of the outer layer; and a second tie layer disposed between and in contact with each of said sealant layer and said second polyamide layer, wherein the volume percent of the second tie layer is between 2% and 15% of the multilayer structure;

wherein the thickness of the multilayer structure is between 1.5 mils and 5 mils, wherein the multilayer structure is biaxially oriented, wherein the package comprising the multilayer structure comprises bone-in meat placed therein and a bone of the bone-in meat protrudes from the meat and contacts the multilayer structure, and wherein the multilayer structure is heat-shrinkable, annealed and has rigidity, strength, oxygen barrier and structure resistance to hold the bone-in meat and does not comprise a double wall or patch.

9. The package of claim 8 wherein said multilayer structure is heat-shrunk around the bone-in meat.

10. The package of claim 8 wherein said first and second polyamide layers each comprise a blend of at least 68% by weight of a first semi-crystalline polyamide, at least 23% by weight of a second semi-crystalline polyamide.

11. The package of claim 8 wherein said first and second polyamide layers comprise an equal percent by volume of the multilayer structure.

12. The package of claim 8, wherein the multilayer structure is crosslinked within a layer of said multilayer structure by irradiation.

13. The package of claim 8, wherein the outer layer comprises linear low density polyethylene.

14. The package of claim 8, wherein the sealant layer comprises linear low density polyethylene.

15. The package of claim 8, wherein the sealant and the outer layer each comprise linear low density polyethylene.

16. The package of claim 8, wherein the second tie layer comprises polyamide.

17. A method of making a package comprising a multilayer structure and bone-in meat, the method comprising the steps of:

coextruding a multilayer structure comprising an outer layer comprising polyethylene wherein the volume percent of the outer layer is between 5% and 25% of the multilayer structure;

a first polyamide layer, wherein said first polyamide layer comprises a blend of between 91% by weight and 99% by weight semi-crystalline polyamide and 1% by weight to 9% by weight amorphous polyamide; wherein the volume percent of the first polyamide layer is between 15% and 25% of the multilayer structure;

a first tie layer disposed between and in contact with each of said outer layer and said first polyamide layer, wherein the volume percent of the first tie layer is between 2% and 15% of the multilayer structure;

a barrier layer disposed in contact with said first polyamide layer wherein said barrier layer comprises ethylene vinyl alcohol copolymer having an ethylene content of between 27 mol % and 42 mol %;

a second polyamide layer disposed in contact with said barrier layer, wherein said second polyamide layer comprises a blend of between 91% by weight and 99% by weight semi-crystalline polyamide, and between 1% by weight and 9% by weight amorphous polyamide, wherein the volume percent of the second polyamide layer is between 15% and 25% of the multilayer structure;

a sealant layer, comprising polyethylene, wherein the volume percent of the sealant layer is greater than the volume percent of the outer layer; and a second tie layer disposed between and in contact with each of said sealant layer and said second polyamide layer, wherein the volume percent of the second tie layer is between 2% and 15% of the multilayer structure;

biaxially orienting said multilayer structure using a tubular process whereby each layer of the multilayer structure is coextruded together as a bubble, cooled, then reheated and oriented in both the longitudinal and transverse directions, and annealing said multilayer structure and then, placing bone-in meat within the package and heat shrinking the package around the bone-in meat, wherein a bone of the bone-in meat protrudes from the meat and contacts the multilayer structure, and wherein the thickness of the multilayer structure is between 1.5 mils and 5 mils, and wherein the multilayer structure has rigidity, strength, oxygen barrier and puncture resistance to hold the bone-in meat and does not comprise a double wall or patch.

18. The method of claim 17 wherein said outer layer is between 15% by volume and 20% by volume of the multilayer structure and the heat sealant layer is between 25% by volume and 30% by volume of the multilayer structure.

19. The method of claim 17 further comprising a step of irradiating said multilayer structure to promote crosslinking between the layers of said multilayer structure, prior to the placing step.

20. The method of claim 17 further comprising the step of moisturizing said multilayer structure by applying water to said multilayer structure, prior to the placing step.

21. The method of claim 17 wherein the tubular process comprises a double bubble process.

22. The method of claim 21, wherein the multilayer structure is oriented in the second bubble of the double bubble process.

23. The method of claim 17, wherein the outer layer comprises linear low density polyethylene.

24. The method of claim 17, wherein the sealant layer comprises linear low density polyethylene.

25. The method of claim 17, wherein the sealant and the outer layer each comprise linear low density polyethylene.

* * * * *